(12) United States Patent
Ohishi

(10) Patent No.: US 6,643,823 B1
(45) Date of Patent: Nov. 4, 2003

(54) WAVEFORM GENERATING CIRCUIT

(75) Inventor: Tadashi Ohishi, Tokyo (JP)

(73) Assignee: Ando Electric Co., Ltd., Tokyo (JP)

( * ) Notice: Subject to any disclaimer, the term of this patent is extended or adjusted under 35 U.S.C. 154(b) by 0 days.

(21) Appl. No.: 09/567,256

(22) Filed: May 9, 2000

(30) Foreign Application Priority Data

Jun. 29, 1999 (JP) ........................................ P. 11-184350

(51) Int. Cl.$^7$ ........................... G06F 11/10; H03M 1/66
(52) U.S. Cl. ........................................ 714/825; 341/144
(58) Field of Search ................................ 714/798, 811, 714/812, 814, 816, 825, 844, 738, 740

(56) References Cited

U.S. PATENT DOCUMENTS

| | | | | |
|---|---|---|---|---|
| 5,093,845 A | * | 3/1992 | Kondoh et al. ............ | 375/242 |
| 5,182,558 A | * | 1/1993 | Mayo ........................ | 341/118 |
| 5,432,797 A | * | 7/1995 | Takano ...................... | 714/718 |
| 5,859,605 A | * | 1/1999 | Raghavan et al. .......... | 341/143 |

\* cited by examiner

*Primary Examiner*—Christine T. Tu
(74) *Attorney, Agent, or Firm*—Fish & Richardson P.C.

(57) ABSTRACT

The waveform generating circuit according to the present invention includes a data selector (105) and edge selectors (107, 109). The data selector (105) inputs two data having the same bit number as input data (111, 113) and divides the total bit number (2N) of the inputted two data into two data on a basis of a setting value ($\alpha$). The edge selector (107) generates in response to a timing edge (117), as an output waveform (119), the waveform corresponding to a first data (115) which is one of the two divided data of the total bit number. The edge selector (109) generates in response to a timing edge (123), as an output waveform (125), the waveform corresponding to a second data (121) which is the other of the two divided data of the total bit number.

4 Claims, 3 Drawing Sheets

WAVEFORM GENERATING CIRCUIT

BACKGROUND OF THE INVENTION

The present invention relates to a waveform generating circuit and, in particular, relates to a circuit which is applied to a tester for a semiconductor integrated circuit or the like and generates plural kinds of waveforms by using stored information of a data memory.

Waveforms for testing are necessary in the field of a tester for a semiconductor integrated circuit or the like. In such a field, it is required to generate plural kinds of waveforms for testing.

FIG. 3 is a block diagram showing the configuration of a waveform generating circuit known as a prior art. The waveform generating circuit is formed by pattern memories (data memories) 201, 203 and edge selectors 205, 209. The conventional circuit configuration is arranged in a manner that kinds (N-th power of 2) of waveforms capable of being represented is determined by data width (N bits) of the data stored in each of the pattern memories (201, 203).

Each of the pattern memories 201, 203 stores data of N-bits. The edge selectors 205, 209 respectively input data 202, 204 each having a data width of N-bits. The edge selectors 205, 209 select edges in response to a timing edge 207 and a timing edge 211 to generate N-th power of 2 kinds of waveforms as output data 213 and output data 215, respectively.

In a case of generating waveforms more than the kinds of waveforms capable of being represented by the data width (N bits), the kinds of waveforms can be increased if a waveform synthesizing circuit 219 show in FIG. 3, for example, is further provided so as to synthesize the output data. The waveform synthesizing circuit 219 serves as an OR gate which outputs an output waveform 217 on a basis of the logical sum of the output waveform 213 and the output waveform 215. In this case, since the variation of the output waveform 215 is contained within the variation of the output waveform 217, the output waveform 217 can not be utilized separately from the output waveform 215.

For example, in a case of supplying waveforms to a plurality of pins of an integrated circuit, it may be sometimes recognized on a circuit designer side in advance that there are pins to which a waveform of a large number of bits is required to be supplied and other pins to which a waveform of a small number of bits may be supplied. Thus, it is desired that a large number of bits is inputted into the edge selector to increase the variation of the waveforms corresponding to the large number of bits and on the other hand that the waveforms corresponding to the small number of bits are also generated and utilized.

SUMMARY OF THE INVENTION

Accordingly, an object of the invention is to provide a waveform generating circuit which can increase the kinds of output waveforms without depending on the width of data stored in a data memory.

Another object of the invention is to provide a waveform generating circuit which can increase the kinds of output waveforms generated from one of two output data and can effectively utilize waveforms in a manner that the waveforms generated from the other of the two output data are not contained in the variation of the waveforms generated from the one of the two output data.

In order to attain the aforesaid objects, the waveform generating circuit according to the invention is characterized by including section (105) for unevenly distributing, in response to N bit data (111, 113) stored in each of a plurality of data memories (101, 103), total bit number (2n) of the N bit data stored in the plurality of data memories; and section (107, 109) for generating waveforms on a basis of the data (115, 121) of the total bit number thus distributed unevenly.

According to another aspect of the invention, the waveform generating circuit according to the invention includes a dividing section (105), a first waveform section (107) and a second waveform section (109). The dividing section (105) inputs two data (111, 113) having same bit number and divides the total bit number (2N) of the two data thus inputted into two data on a basis of a setting value $\alpha$. The first waveform section (107) generates, in response to a first edge signal (117), one (115) of the two data obtained by dividing the total bit number as a first waveform (119). The second waveform section (109) generates, in response to a second edge signal (123), the other (121) of the two data obtained by dividing the total bit number as a second waveform (125).

In this case, the absolute value of the setting value ($\alpha$) is set to an integer equal to or less than the bit number (N) of each of the two input data (that is, $|\alpha| \leq N$). Further, the total bit number (2N) is divided in the two data in a manner that each of the two data (N+$\alpha$, N-$\alpha$) obtained by dividing the total bit number is relative with respect to the setting value ($\alpha$).

According to the aforesaid configuration, the kinds of the waveform of one of the two output data can be increased and the waveform of the other of the two output data can be utilized.

DETAILED DESCRIPTION OF THE PREFERRED EMBODIMENTS

Figure 1:
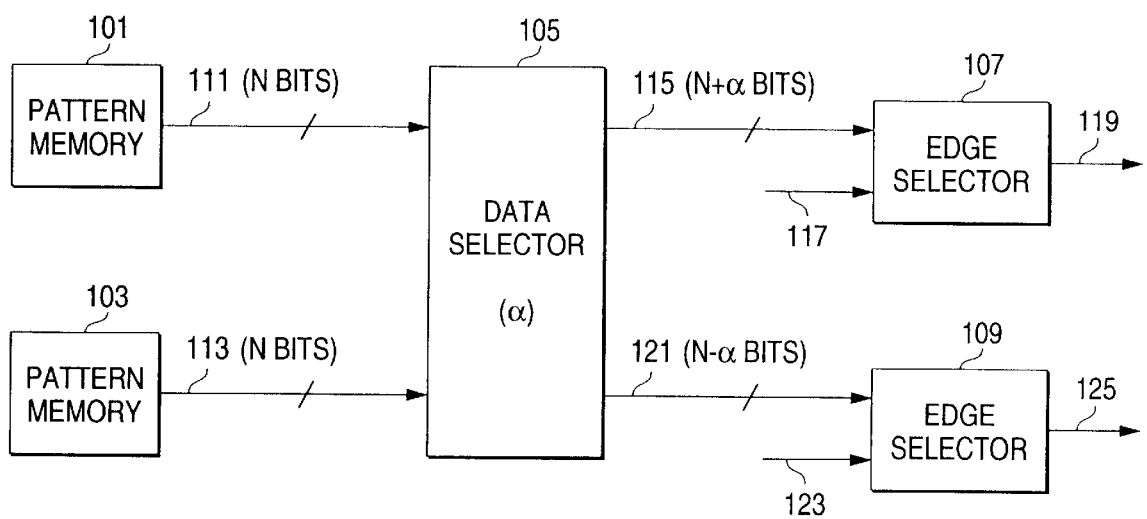
FIG. 1 is a block diagram showing a waveform generating circuit according to the embodiment of the invention.

The embodiment of the invention will be explained with reference to the accompanying drawings. FIG. 1 is a block diagram showing a waveform generating circuit according to the embodiment of the invention. As shown in FIG. 1, the waveform generating circuit is formed by pattern memories 101, 103, a data selector 105 and edge selectors 107, 109.

Each of the pattern memories (data memories) 101, 103 stores data for determining waveforms to be generated. The data stored in each of the pattern memories 101, 103 has a data width of a fixed length of N bits.

The data selector 105 inputs therein data 111, 113 stored in the pattern memories 101, 103. A value ($\alpha$) is set in the data selector 105 as a setting value. The setting value $\alpha$ is set as a positive numeral equal to or less than the data width (N bits) of the input data 111, 113. Alternatively, the absolute value of the setting value $\alpha$ is set to an integer equal to or less than the data width of the input data 111, 113.

The data selector 105 unevenly distributes the total bit number (2N) of the input data 111, 113 to the number of the data memories (edge selectors). In this embodiment, the total bit number divided in two becomes relative with respect to the setting value $\alpha$. In other words, the data widths N of the respective input data are changed into the data widths which are separated to each other by the value based on the setting value α, that is, N+α, N−α, respectively.

The edge selector 107 inputs therein the first data 115 which is one (N+α bits) of the two-divided data. A timing edge 117 includes X edge triggers. The edge selector 107 is in advance made associate with the waveform corresponding to the first data 115 and selectively inputs the edge trigger contained in the timing edge 117 to generate the waveform.

The edge selector 107 includes an RS flip flop circuit at the output stage thereof. The X edge triggers are allotted in advance so that they are selectively inputted into the set terminal and the reset terminal of the RS flip flop circuit, whereby the waveform being made correspond to the first data 115 in advance is generated.

Thus, when the first data 115 is (N+α) bits, the edge selector 107 can generate (N+α)-th power of 2 kinds of output waveforms (output data) 119 in response to the timing edge 117.

Similarly, the edge selector 119 inputs the second data 121 which is the other (N−α bits) of the two-divided data. A timing edge 123 includes X edge triggers. The edge selector 109 is in advance made associate with the waveform corresponding to the second data 121 and selectively inputs the edge trigger contained in the timing edge 123 to generate the waveform.

The edge selector 109 includes an RS flip flop circuit at the output stage thereof. The X edge triggers are allotted in advance so that they are selectively inputted into the set terminal and the reset terminal of the RS flip flop circuit, whereby the waveform being made correspond to the second data 121 in advance is generated.

Thus, when the second data 121 is (N−α) bits, the edge selector 109 can generate (N−α)-th power of 2 kinds of output waveforms (output data) 125 in response to the timing edge 123. The output waveform 125 is not contained in the variation of the output waveform 119.

The operation of the waveform generating circuit according to the embodiment will be explained. As a concrete example, the explanation will be made as to a case where the number N of input bits is 3 and the setting value α is 1. For example, the pattern memory 101 supplies "110" as 3 bit data to the data selector 105. On the other hand, the pattern memory 103 supplies "010" as 3 bit data to the data selector 105.

The data selector 105 merges both the 3 bit data inputted from the pattern memories 101 and 103 and divides the data "110010" of the total bit number (3+3 bits) into the first data 115 ("1100") of four bits and the second data 121 ("10") of two bits.

In this embodiment, although the two input data "110" and "010" are merely merged as the higher order 3 bits and the lower order 3 bits to be "110+010", respectively, the merging method in the invention is not limited thereto. For example, the two input data may be merged alternately one bit by one bit so as to be "1 (0) 1 (1) 0 (0)". In this embodiment, although the data "110010" of the total bit number is merely divided into the higher order 4 bits "1100" and the lower order two bits "10", the invention is not limited to such a unevenly dividing method of the total bit number into two data, and the numbers of the divided bits of the higher order and the lower order may be selected arbitrarily.

Figure 2A:
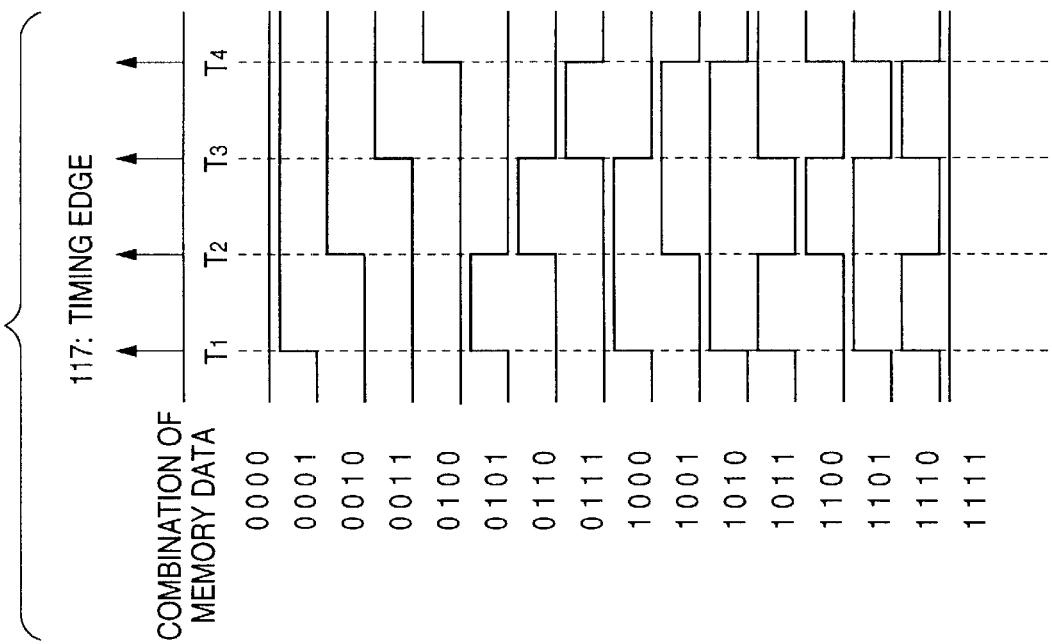
FIGS. 2A and 2B are timing chart showing a part of the operation of the waveform generating circuit according to the embodiment of the invention.
Figure 2B:
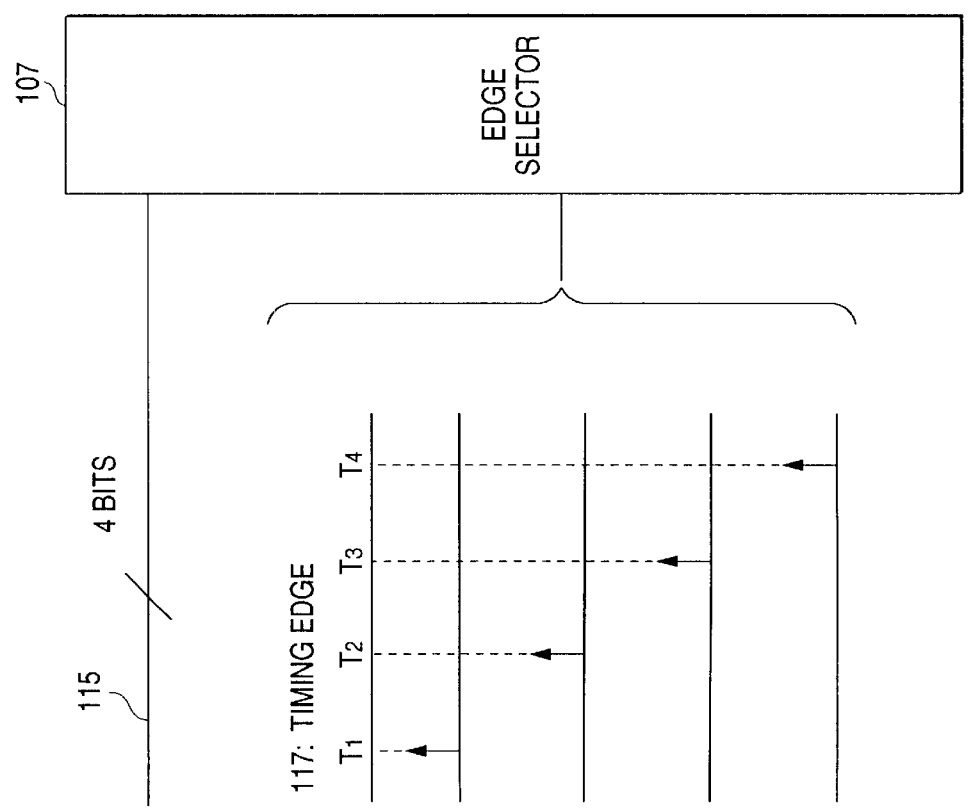
Figure 3:
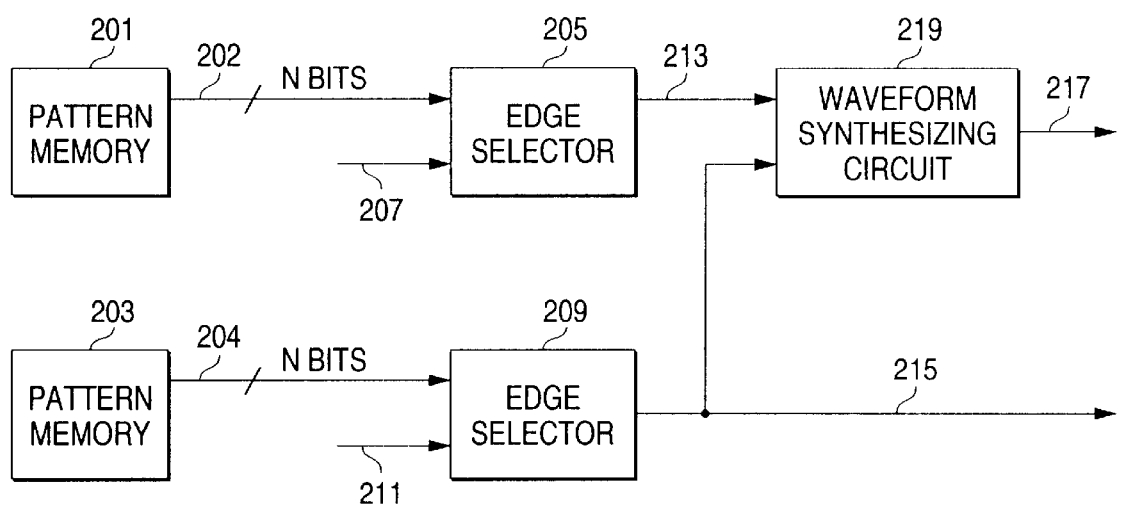
FIG. 3 is a block diagram showing a waveform generating circuit known as a prior art.

FIGS. 2A and 2B are diagram showing the operation of the edge selector 107. FIG. 2A shows a state where the timing edge 117 is inputted into the edge selector 107. In this timing edge 117, four edge triggers are generated at the time points T1, T2, T3 and T4. The edge selector 107 generates the waveform being made correspond to the first data 115 "1100" in advance.

FIG. 2B is a timing chart showing a state where the waveform is generated by the edge selector 107. In a case where the first data 115 of four bits is inputted, the edge selector 107 can generate 16 kinds of waveforms (0000–1111) as the waveform variation.

As described above, the RS flip flop circuit is provided at the output stage of the edge selector 107, and the combination of the four bit data and the waveform variation are made correspond to each other in advance as shown in FIG. 2B. In this concrete example, the first data 115 "1100" is made correspond to the waveform shown in the right side in advance.

That is, in order to generate the waveform corresponding to the first data 115 "1100", the edge selector 107 inputs the edge trigger at the time point T2 into the set terminal of the RS flip flop circuit and inputs the edge trigger at the time point T3 into the reset terminal thereof. Further, the edge selector inputs the edge trigger at the time point T4 into the set terminal. Accordingly, the waveform being made correspond to the first data 115 "1100" in advance can be generated.

Similarly, the edge selector 109 generates the output waveform 125 being made correspond to the second data 121 "10" in advance in response to the timing edge 123. In the edge selector 109, the combination of the two bit data and the waveform variation are made correspond to each other in advance. In this case, in order to generate the waveform corresponding to the second data 121 "10", the edge selector 109 selectively inputs the edge triggers contained in the timing edge 123 to the reset terminal and the set terminal of the RS flip flop circuit provided at the output stage thereof, respectively.

In the invention, the setting value α may be set in advance or changed in real-time. In a case of changing the setting value in real-time, a control section (not shown) changes the setting value of the data selector 105 by taking the timing with the input data (111, 113) into consideration while monitoring the output data (119, 125).

Further, although the RS flip flop circuit is applied to the output stage of the edge selector 107 (109), the invention is not limited thereto. Any circuit arrangement may be employed in place of the RS flip flop circuit as long as the circuit operates to selectively input the edge trigger so as to generate the waveform (see FIG. 2B) being made correspond to plural bits of data in advance.

The waveform generating circuit according to the invention is arranged in a manner that the data selector for unevenly distributing the total bit number of the input data is provided between the plurality of the data memories and the edge selectors corresponding thereto. Thus, it becomes possible to increase the kinds of waveforms being generated and to effectively utilize the waveforms.

What is claimed is:

1. A waveform generating circuit comprising:

section for unevenly distributing, in response to N bit data stored in each of a plurality of data memories, total bit number of the N bit data stored in said plurality of data memories; and section for generating waveforms on a basis of the data of the total bit number distributed unevenly.

2. A waveform generating circuit comprising:
a dividing section for inputting two data having same bit number and dividing total bit number of the two data inputted into two data on a basis of a setting value;
a first waveform section for generating, in response to a first edge signal, one of the two data obtained by dividing the total bit number as a first waveform; and
a second waveform section for generating, in response to a second edge signal, the other of the two data obtained by dividing the total bit number as a second waveform.

3. The waveform generating circuit according to claim 2, wherein
the total bit number is divided in the two data in a manner that each of the two data obtained by dividing the total bit number is relative with respect to the setting value.

4. The waveform generating circuit according to claim 2, wherein
an absolute value of the setting value is an integer equal to or less than the bit number.

* * * * *